No. 857,247. PATENTED JUNE 18, 1907.
A. E. MENNE.
APPARATUS FOR FUSING METALS.
APPLICATION FILED JULY 9, 1906.
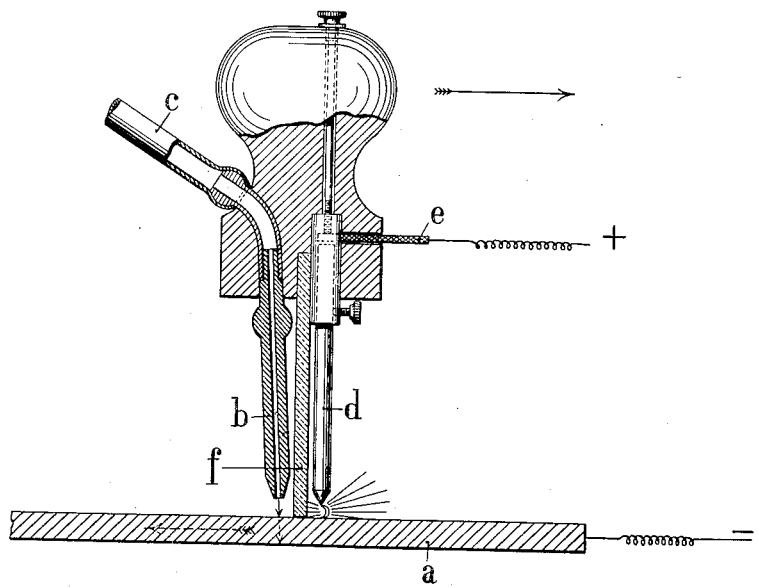

UNITED STATES PATENT OFFICE.

ADOLPH ERNST MENNE, OF CRENZTHAL, GERMANY, ASSIGNOR TO CÖLN-MUSENER-BERGWERKS-ACTIEN-VEREIN, OF CRENZTHAL, GERMANY, A CORPORATION OF GERMANY.

APPARATUS FOR FUSING METALS.

No. 857,247.  Specification of Letters Patent.  Patented June 18, 1907.

Application filed July 9, 1906. Serial No. 325,362.

*To all whom it may concern:*

Be it known that I, ADOLPH ERNST MENNE, a subject of the German Emperor, and a resident of Crenzthal, Westphalia, Germany, have invented new and useful Apparatus for Fusing Metal, of which the following is a specification.

The present invention relates to an apparatus for fusing or melting metals, sheets of metal, and the like, employing oxygen and electricity.

Hitherto the electric heating has been effected by an electrode which has simultaneously also served as a means of supplying gas, while according to the present invention the gas supply is effected quite independently of the supply of currents. In this way the important result is first of all obtained, that the oxygen cannot act on the electrode which has become heated by the electric current, and cause it to become overheated, and secondly the oxygen does not exercise a blowing action on the electric arc. For the latter purpose a partition may be inserted between the nozzles which serve for supplying gas and the electrode which serves for supplying electricity, in such a way that the blast does not blow on the arc, and on the other hand the electrode is protected from the overheating action of the oxygen from the nozzle.

More particularly the present invention consists in means for fusing or melting holes through sheets of metal, and in order that the details of construction and action of the invention may be more clearly understood reference is made to the accompanying drawing in which one form of apparatus is shown in elevation partly in section.

$a$ is a metal sheet which is to be melted through; $b$ is the nozzle to which oxygen is supplied in suitable manner through the tube $c$; several nozzles may also be employed and a mixture of oxygen and other gases may be supplied instead of oxygen.

$d$ is an electrode which is in connection with an electric conductor $e$. The latter is joined with one pole of a dynamo, accumulator, or other source of electricity, while the piece of work $a$ is connected with the other pole in a suitable manner.

$f$ is a sheet of asbestos or like fire-proof material. Of course the parts $b$, $d$ and $f$ may be joined with one another in suitable manner. They may be arranged fixed, while the piece of work under the same may be moved. But $a$ may also be fixed, while $b$, $d$, $f$ are joined with one another making a separate tool with which it is only necessary to brush over the piece of metal in order to melt a hole through the latter.

In the drawing the whole device is shown as a single tool, having a rounded handle, which carries the gas nozzle, the partition and the electrode. The latter is held by a set screw in a holder, which in turn is held by a rod passing through the handle.

What I claim as my invention and desire to secure by Letters Patent is:

1. A device for fusing metal comprising in combination means connecting said metal to one pole of a source of electricity, an electrode, means connecting said electrode to the other pole of said source of electricity, whereby an arc may be formed between said electrode and said metal, and means insulated electrically from said electrode adapted to supply gas supporting combustion to said arc, substantially as described.

2. A device for fusing metal comprising in combination, means connecting said metal to one pole of a source of electricity, an electrode, means connecting said electrode to the other pole of said source of electricity, whereby an arc may be formed between said electrode and said metal, and a nozzle insulated electrically from said electrode adapted to supply gas supporting combustion to said arc, substantially as described.

3. A device for fusing metal comprising in combination means connecting said metal to one pole of a source of electricity, an electrode, means connecting said electrode to the other pole of said source of electricity, whereby an arc may be formed between said electrode and said metal, a nozzle insulated electrically from said electrode adapted to supply gas supporting combustion to said arc, and a partition between said nozzle and said electrode, substantially as described.

4. A device for fusing metals comprising in combination means connecting said metal to one pole of a source of electricity, an electrode, means connecting said electrode to the other pole of said source of electricity, whereby an arc may be formed between said electrode and said metal, a nozzle insulated electrically from said electrode adapted to supply gas supporting combustion to said arc, a partition between said nozzle and said electrode, and means uniting said electrode, nozzle and partition whereby the same may be mounted on a tool, substantially as described.

In testimony, that I claim the foregoing as my invention, I have signed my name in presence of two witnesses, this twenty-seventh day of June 1906.

ADOLPH ERNST MENNE.

Witnesses:
BESSIE F. DUNLAP,
LOUIS VANDORY.